Patented July 12, 1938

2,123,658

UNITED STATES PATENT OFFICE 2,123,658

PROCESS FOR DEPHOSPHORIZING METALS

René Perrin, Paris, France, assignor to Societe d'Electrochimie, d'Electrometallurgie et des Acieries Electriques d'Ugine, Paris, France, a corporation of France No Drawing. Application April 9, 1936, Serial No. 73,589. In France April 16, 1935

2 Claims. (Cl. 75—54)

The present invention concerns a process for dephosphorizing pig iron and steels, more particularly hard steels.

In Patent No. 2,015,692 of October 1, 1935, the applicant has described an extremely rapid process for the dephosphorization of steel in which the metal is caused to act upon a basic and oxidizing slag with an energy such that a violent intermixing of the metal and of the slag is caused, bringing about a turbulent emulsion of the slag in the metal and allowing consequently an almost instantaneous dephosphorization to be obtained due to the intimate interpenetration of the metal and of the slag.

In the above mentioned patent there has been indicated amongst others a particular method of carrying out the process in question consisting in violently pouring the metal in a large jet upon the molten slag placed at the bottom of a ladle, the violence of the pouring being such that it produces the pulverization of the slag and its emulsification in the metal.

Now the applicant has observed during experiments upon pig iron and hard steels with the use of basic oxidizing slags that when it is attempted to cause the metal to act upon the slag with an energy such as that employed in the process of the above mentioned patent, for example by violent pouring of the metal upon the slag in a receptacle, there is produced, as a consequence of an extremely copious gaseous evolution, an explosive reaction involving the projection of a part or even of the whole of the metal and of the slag out of the receptacle.

When on the contrary the metal is caused to act upon the slag without imparting considerable energy to the metal, for example by pouring the metal relatively slowly upon the slag and by interrupting the pouring from time to time, there is still obtained a gaseous evolution but this no longer involves the projection of the metal and of the slag out of the receptacle but produces, however, a sufficient intermixing of the slag and of the metal by projection of the metal into the body of the slag.

The applicant has studied:
1. What was the reason of this phenomenon and under what conditions it was produced.
2. In what cases and by means of what precautions it was possible to utilize it for producing a certain intermixing and for producing rapid reactions between slag and metal involving practical results of dephosphorization under conditions of economical interest.

The applicant has ascertained by successive experiments:
1. That there is no relation between this phenomenon and the phosphorus content of the metal.
2. That with the same slag heated to the same temperature the phenomenon is the more violent the more carburized the metal.
3. That with the same metal at the same temperature the phenomenon is the more violent the more oxidized the slag.
4. That with the same slag and the same metal the phenomenon is the more violent the higher the temperature of the reacting elements.

Moreover it has been observed, at each experiment which gave rise to a certain gaseous evolution produced by the action of a basic and oxidizing slag upon a pig iron or a steel and which produced itself a certain seething ensuring an intermixing of the metal and of the slag, that from this fact more or less considerable but always appreciable dephosphorization is obtained according to the greater or less intensity of seething which is produced.

The analysis of these results led the applicant to the following theory.

When there is caused to act upon a carburized steel or pig iron rich in phosphorus, a basic oxidizing slag, two main reactions are produced, the reduction of the iron oxide by the carbon of the bath, and the combined reaction upon the phosphorus of this oxide and of the base of the slag.

The first of these reactions, $C+FeO=CO+Fe$, gives rise to the evolution of carbon monoxide and it is this which produces the seething. The reaction speed is evidently a function of the temperature, of the carbon content of the metal, and of the FeO content, or more exactly of the disparity existing between the contents of these elements at the moment of placing the metal and the slag into contact and the final contents when equilibrium is established; but it evidently also depends upon the pressure of CO according to the law of mass action. The fact that the removal of the gas evolved cannot be instantaneous thus slows down the reaction by creating an opposing pressure of CO and limits the reaction. When the evolution of gas is finished, this opposing pressure ceases and the reaction may proceed, but at this moment the intimate contact of the slag and of the metal has ceased, the density of the metal having drawn it to the bottom of the receptacle and from this fact the reduction of the carbon content is limited.

The second reaction, which is the well known reaction of dephosphorization by formation of phosphoric acid and then of basic phosphate, for example calcium phosphate, does not itself involve any formation of gas. Its speed is thus controlled solely by the disparity with respect to equilibrium of the contents of the reacting elements of the metal and of the slag, by the extent of the slag-metal contact, and by the speed of diffusion, it is not subject to the same cause of slowing down as the first reaction.

The fundamental idea of the applicant resides precisely in the utilization of the difference of speed existing between these two reactions, employing the first not to obtain considerable decarburization but simply to obtain a sufficiently intense seething and consequently an intermixing of the metal and of the slag, leading to the rapid development of the second reaction and on the other hand in the control of the reaction of explosive species thus produced, so that there takes place a violent seething without however there being a risk of explosion.

According to the present invention the dephosphorization will be effected by the action upon the metal of a molten basic and oxidizing slag of such composition and at such a temperature that the iron oxide of the slag is reduced by the carbon of the bath, and so that there is produced by intense evolution of carbon monoxide a seething producing intermixing of the metal and of the slag and consequently ensuring rapid dephosphorization of the metal.

The necessary seething may be produced in particular by causing the metal to act upon the slag with an energy which is sufficient to initiate the reaction of seething and to ensure a sufficient intermixing but which is not such that the said reaction becomes explosive.

It should be observed that the operation, in spite of the formation of CO which is produced, does not modify to a very substantial extent the carbon content of the metal, for it is sufficient that a very small quantity of carbon shall be oxidized in order to develop, at the temperatures in view, a very considerable volume of gas and one sufficient to produce an intense seething.

Obviously the slag intended for a determined metal should be chosen with a composition suitable for eliminating phosphorus, that is to say basic and oxidizing. When the metal contains besides phosphorus, other more oxidizable elements such for example as silicon, the quantity of slag to be employed and its iron oxide content should be chosen so that after oxidation of these elements the slag maintains a sufficiently basic and oxidizing character to be able to dephosphorize to the extent desired.

A preferred method of carrying out the process which forms the subject of the invention consists in pouring, in general without violence, the metal upon the molten slag placed at the bottom of a ladle. It has been observed according to the invention that by suitably adjusting the height from which the metal is poured and the speed of pouring, and, if desired, by interrupting from time to time the pouring of the metal, there may be obtained in the ladle a seething the violence of which is not such that the metal and the slag are projected out of the ladle, but which is however energetic enough to produce by the effect of the slag-metal intermixing a very considerable dephosphorization.

Obviously the method of carrying out the pouring, the speed of pouring, and the height from which the metal falls should be adapted to the more or less oxidizing character of the slag, to the higher or lower carbon content of the metal, as well as to the temperature. It is suitable in general to pour the metal in a rather thin jet and from a less height than that corresponding to the method of violent pouring disclosed in particular in Patent No. 2,015,692 mentioned above, but this height should still be relatively considerable, for it is necessary that the metal when falling into the slag should entrain a small part thereof so that the reaction of seething may be initiated. If the pouring is not carried out from a sufficient height or is performed too slowly, the metal will pass under the slag without producing considerable gaseous reaction, there will not be projection of the metal into the slag and the dephosphorization will be very small.

To sum up, the method of operation of pouring the metal upon the slag should be maintained in an intermediate zone between;—too rapid a pouring, which would only lead to expelling the metal and the slag from the receptacle;—too slow a pouring, or pouring from too small a height, which would give an insufficient gaseous evolution to project the metal violently into the slag and to obtain sufficient contact.

An advantageous method of operation consists in first pouring the metal into a ladle, and in the pouring it from the bottom of this ladle interrupting if desired the pouring if the seething becomes too violent and a danger arises of the ladle of slag overflowing.

The process according to the invention finds an application of particular interest in the dephosphorization of acid Bessemer steel. The Bessemer steel is first worked up in the usual manner by blowing until an extra mild steel is obtained, then the metal is recarburized and the desired additions of ferromanganese are made thereto, then the dephosphorization of this recarburized metal is carried out according to the process which forms the subject of the application, by causing to act upon the said metal so as to produce seething, a suitable dephosphorizing slag, for example by slowly pouring the metal into the said slag which has been previously melted.

In this case, the metal containing manganese, it will be of interest, so that this manganese is not uselessly oxidized, to add to the basic dephosphorizing slag manganese oxide, MnO or $Mn_3O_4$. By calculation and experiment the quantity of these oxides to be added will be determined, so that after the operation the Mn content is not lowered, which implies that after the operation the ratio $$\frac{MnO}{FeO}$$

has a value superior or equal to $K_{Mn} \times Mn$, $K_{Mn}$ being the well known constant of manganese and Mn the initial manganese content. The constant referred to ($K_{Mn}$) is the constant defined by the relation:

$$K_{Mn} = \frac{MnO}{FeO} \times \frac{1}{Mn}$$

wherein MnO and FeO are the contents of the slag in manganese oxide and in iron oxide respectively and Mn is the content of manganese of the metal. Said constant, which is well known to skilled metallurgists, is described in the following publications: G. Tamann, W. Oelsen—Arch. Eisenhuttenwesen 5 (1931—1932) 75 K for basic and acid slags. C. H. Herty (Trans. Amer.

Inst. Min. Met. Enf. 73 (1926—1927) (K for basic slags).

If desired this dephosphorization operation may be followed by a deoxidation operation effected for example according to the process described in Patent No. 2,015,691 of the applicant.

The dephosphorization process according to the invention may likewise be applied to blast furnace pig iron. To preserve the manganese of the latter, if desired an addition of manganese may be made in the slag. In the case when the pig iron contains silicon a quantity of slag will be added such, and having such a content of MnO or other bases, that in spite of the enrichment of the slag in silica the slag will remain definitely basic till the end of the operation.

It has been recognized that by causing a basic and oxidizing slag to act upon blast furnace pig iron under conditions according to the process forming the subject of the invention, for example by cautiously pouring the metal upon the said slag, a violent intermixing is obtained ensuring rapid dephosphorization without however causing the contents of the receptacle to overflow.

In the following there is given an example of carrying out the process according to the invention applied to the dephosphorization of a pig iron.

A ladle containing 500 kgs. of a pig iron with

| | Percent |
|---|---|
| Carbon | 3.3 |
| Silicon | 0.300 |
| Phosphorus | 0.120 |
| Manganese | 1.1 | was slowly poured from a height of 3 metres into a ladle containing about 60 kgs. of a slag of the following composition.

| | Percent |
|---|---|
| $SiO_2$ | 20 |
| FeO | 25 |
| MnO | 11 |
| CaO | 41 |
| $Al_2O_3$ | 1 |
| MgO | 2 |

A strong seething was produced during the whole of the pouring which was carried out in a regular manner and the duration of which was about a minute and a half. A little after the termination of the pouring the seething calmed down and then stopped completely.

The metal then had the following analysis;

| | Percent |
|---|---|
| C | 3.080 |
| Si | 0.050 |
| P | 0.022 |
| Mn | 0.9 |

The carbon content of the metal was thus lowered from 3.30% to 3.08% besides the content of silicon from 0.030% to 0.005%. The phosphorus content fell from 0.120% to 0.022% that is a dephosphorization of 18.33%.

The analysis of the slag after the operation was the following:

| | Percent |
|---|---|
| FeO | 5.3 |
| $SiO_2$ | 29 |
| CaO | 48 |
| MnO | 13 |
| $P_2O_5$ | 2 |
| $Al_2O_3$ | 0.9 |
| MgO | 1.8 |

What I claim is:

1. A process for dephosphorizing acid Bessemer steel by means of an oxidizing basic slag, which consists in adding to the steel a metallic substance of the group comprising manganese and ferromanganese and then pouring with such care the molten steel into a ladle containing the molten slag at such a temperature and with such a content of iron oxide that said iron oxide in the slag is reduced by carbon in the steel so as to produce, with the formation of carbon monoxide a seething which is sufficiently active to cause intermixing of the steel and of the slag and thereby a rapid dephosphorization of the said steel but not so intense as to cause the contents of the ladle to overflow.

2. In a process for dephosphorizing iron and hard steel by pouring the molten metal into a ladle containing oxidizing basic fluid slag, so regulating the rate and the height from which the metal is poured in correlation with its carbon content and the temperature and iron content of the slag that a violent evolution of carbon monoxide takes place resulting in the production of a seething layer of the slag permeated by carbon monoxide bubbles into which layer metal particles are projected upwards from the underlying metal, leading to an almost complete intermixing of the metal and the slag and thereby to a rapid dephosphorization of said metal.

RENÉ PERRIN.